United States Patent [19]
Henry

[11] Patent Number: 5,244,480
[45] Date of Patent: Sep. 14, 1993

[54] HIGH EFFICIENCY PARTICULATE AIR FILTER VENTILATION SYSTEM WITH AIR CONDITIONING UNIT AND ENVIRONMENTAL MONITORING UNIT

[76] Inventor: Harold G. Henry, 41 Ponderosa La., Palmyra, Va. 22963

[21] Appl. No.: 17,392

[22] Filed: Feb. 12, 1993

Related U.S. Application Data

[63] Continuation-in-part of Ser. No. 786,762, Nov. 1, 1991, Pat. No. 5,192,343.

[51] Int. Cl.[5] .............................................. B01D 46/04
[52] U.S. Cl. ......................................... 55/213; 55/320; 55/500; 95/19
[58] Field of Search ..................... 55/21, 92, 213, 318, 55/320, 472, 500

[56] References Cited

U.S. PATENT DOCUMENTS

| | | | |
|---|---|---|---|
| 4,312,645 | 1/1982 | Mavros et al. | 55/213 |
| 4,450,964 | 5/1984 | Wood | 206/527 |
| 4,521,234 | 6/1985 | Peebles, Jr. et al. | 55/481 |
| 4,784,675 | 11/1988 | Leber et al. | 55/213 |
| 4,786,295 | 11/1988 | Newman et al. | 55/213 |
| 4,838,910 | 6/1989 | Stollenwerk et al. | 55/385.2 |
| 4,929,261 | 5/1990 | Jacobson | 55/213 |
| 4,979,967 | 12/1990 | Walter et al. | 55/84 |
| 5,042,997 | 8/1991 | Rhodes | 55/213 X |

*Primary Examiner*—Charles Hart
*Attorney, Agent, or Firm*—Cushman, Darby & Cushman

[57] ABSTRACT

A high efficiency ventilation system for removing contaminants from an area used in combination with an air conditioner or an environmental monitoring system. The system includes a fan unit and filter unit. The filter unit has two filters, a prefilter and a HEPA filter, each of which has its static pressure monitored by a separate gauge. The static pressure of the fan used in the fan unit is monitored by a third gauge. Thus, it is possible to determine which of two filters needs replacement and troubleshooting can be performed much faster and more efficiently. The air conditioner is coupled to the output of the fan so as to condition the air discharged from the ventilation system and pass the air back into the work area. The environmental monitoring unit may instead be coupled to the output of the fan so as to monitor contaminants that remain in the ventilated air.

16 Claims, 6 Drawing Sheets

HIGH EFFICIENCY PARTICULATE AIR FILTER VENTILATION SYSTEM WITH AIR CONDITIONING UNIT AND ENVIRONMENTAL MONITORING UNIT

This application is a continuation-in-part of application Ser. No. 07/786,762 filed Nov. 1, 1991, now allowed as U.S. Pat. No. 5,192,343, issued on Mar. 9, 1993.

BACKGROUND OF THE INVENTION

1. Field of the Invention

This invention relates to an apparatus and a method for filtering air in a predetermined area, wherein the apparatus works in combination with an air-conditioning unit and an environmental monitoring unit. More specifically, the present invention is directed to a method and device for filtering contaminants from a contaminated area in an efficient and safe manner, which is used with an air-conditioning unit or an environmental monitoring system.

2. Description of the Related Art

It is often desirable to filter the air in a closed room due to the presence of contaminants. These contaminants may originate from equipments leaks, chemical spills or any other circumstance whereby contaminants have entered the air. An example of such a setting is a nuclear power facility, where it is desirable to reduce or eliminate the spread of radioactive particles so that the amount of radioactive particles that workers are exposed to is well below preestablished limits.

In the nuclear industry, furthermore, it is desirable to reduce heat stress upon individuals who work in radioactive contamination areas must be dressed in anti-contamination clothing. One proposed method for reducing heat stress is to provide air conditioning to the work area. However, this presents a problem because the work area must be kept under a negative pressure. Otherwise, radioactive contamination would migrate from the work zone. If air is blown directly into a contaminated work area, the pressure in the area will become positive and the radioactive contamination will migrate to areas outside the work zone.

It has also been suggested that an air conditioning system be used in a conventional manner. That is, supply cool air to the work area and remove warm air. However, such a method and apparatus has also proven ineffective, as contamination is removed with the warm air, thus contaminating the air conditioning unit.

A solution to this problem has been proposed. That is, it has been proposed to use a HEPA filtered ventilation system in combination with the air conditioner. A typical ventilation unit has a filter unit and a fan. A gauge is mounted across the filter unit for measuring the differential pressure. The filter unit contains two filters, a prefilter and a HEPA (high efficiency particulate air) filter. Most known units can also be supplied with a carbon filter. All ventilation units, regardless of capacity, are operated in the same manner. Flexible ducting is coupled to the intake of the filter housing and directed to the area that requires ventilation. The exhaust fan is then started and the unit is run until the room has been completely ventilated or the pressure gauge indicates a high reading, suggesting that the filter(s) need changing.

Connecting such a HEPA ventilation unit to an air conditioning unit has several problems. No visual method is known for determining the amount of air flowing through the system. To determine the system air flow requires that velocity measurements be taken, which involves placing a measuring instrument into a potentially contaminated piece of duct work and contaminating the instrument.

As the ventilation system operates, the filters in the filter unit begin to filter out the contaminant in the air. More contaminants are filtered out as the system continues to run. The contaminant filtered out of the air and trapped on the filters cause the static pressure across the filters to increase, which increases the static pressure facing the exhaust fan. The total flow through the ventilation system is thus decreased. The higher the static pressure existing across the filters, the less the air flow. Therefore, it is necessary to perform continuous measurements of the velocity to determine the air flow. However, air conditioning systems are designed to have a certain amount of air passing over the evaporator coils. If too much air passes over the coils, moisture is carried off the coils into the working area. If too little air passes over the coils, the coils will freeze and prevent any air from passing over them.

Another problem faced by the nuclear power industry is the determination of how much radioactive contaminant has been released into the environment. The amount of released contaminant is strictly regulated and large fines can be imposed for nuclear plants that have unregulated releases. All nuclear stations have main ventilation systems equipped with environmental monitors that determine the amount of contamination released into the environment. The main ventilation systems monitor most of the large interconnected buildings, but do not monitor the smaller remote buildings or temporary buildings where work is often performed on contaminated materials. For these areas, nuclear stations will normally perform grab sampling every four hours or so to determine the amount of radioactive material released to the environment. In order to determine properly the amount of radioactive contaminants released to the environment, isokinetic air sampling should be performed. This means that the air being monitored should move at the same velocity at the sampling probe and throughout the exhaust duct of the ventilation unit. However, prior ventilation systems that have been used do not move a constant volume of air, and thus the displaced air moves at a changing velocity.

SUMMARY OF THE INVENTION

The present invention provides a system for removing contaminants from an area and which is used in combination with an air conditioning system or an environmental monitoring unit. The object of the present invention is to efficiently provide cool air to a contaminated work area. A second object of the present invention is to be able to measure contaminants that are not cleaned from air passing through a high efficiency particulate air filter. In accordance with the invention, a first gauge is disposed so as to measure the static pressure across a prefilter, a second gauge to measure the static pressure across the HEPA filter, and a third gauge to measure the static pressure across the fan. Such a construction allows an operator to determine the static pressure across each filter as well as the volume of air being discharged. Thus, since the static pressure across each filter is known at a corresponding volume of air, it is possible to prevent ruptures of filters by changing only the filter that has too large a static pressure thereacross.

The present invention further allows for other problems with the apparatus and the airflow therethrough to be detected early due to the presence of the three individual gauges.

The apparatus according to the present invention includes a fan for moving air through the apparatus. A first monitoring means monitors the first static pressure across the fan. The action of the fan sucks air into a filter housing. Disposed in the housing is a first filter means for prefiltering the air moving through the apparatus. A second monitoring means monitors a second static pressure across the first filter means, and the second monitoring means is disposed on the housing. Also disposed in the housing is a second filter means for filtering the air after the air is filtered by the first filter means. A third monitoring means monitors a third static pressure across the second filter means. The third monitoring means is disposed on the housing proximate the second filter means. The apparatus further includes means for exhausting the air after it has been filtered.

The present invention is also directed at a method for removing a constant volume of air from a contaminated area and filtering the air. The method includes removing air from the area and forcing the air through a prefilter and a HEPA filter via the fan, monitoring the static pressure across each of the fan, prefilter and HEPA filter using first, second and third gauges, respectively, and exhausting the removed air after the air has passed through the fan.

Also, the present invention allows filters to be changed without the use of a respirator by employees. The nature of the filter housing allows for such a efficiency in changing the filter.

The present invention is intended to be used in combination with an air conditioning unit or an environmental monitoring system. By maintaining the discharge volume of the air constant, it is possible to provide cool air to the work area, while at the same time pushing the filtered air back across the evaporator coils of the air conditioning system to cool the air and not contaminate the air conditioning system in the process or cause any damage to the air conditioning system.

Furthermore, by maintaining a constant volume being discharged from the ventilation system, a true isokinetic sampling can be achieved. Because the present invention passes a constant volume through a tube having a constant cross sectional area connected to the exhaust damper of the ventilation system, the following equation suggests that velocity must be a constant:

Volume=Velocity·Area.

Thus, the present invention provides constant velocity for isokinetic sampling. However, before any sample may be taken, the air traveling to a probe should be streamline. This is accomplished by attaching a sufficiently long piece of duct to the exhaust damper. The probe is then disposed in the duct. In order to properly determine the amount of radioactive contaminant released, it is necessary to know also the total amount of air that was discharged. To determine the total amount of air, a hour meter is installed across the exhaust fan motor, which operates whenever the exhaust fan operates. By maintaining the discharge volume of air constant and knowing the amount of time that the unit operated, it is possible to determine the total air discharged per unit time.

BRIEF DESCRIPTION OF THE DRAWINGS

Other objects, features and characteristics of the present invention, as well as the methods of operation and functions of the related elements of the structure, will become more apparent upon consideration of following detailed description and the appended claims with reference to the accompanying drawings, all of which form a part of this specification and wherein:

DETAILED DESCRIPTION OF THE PRESENTLY PREFERRED EXEMPLARY EMBODIMENTS

Figure 1:
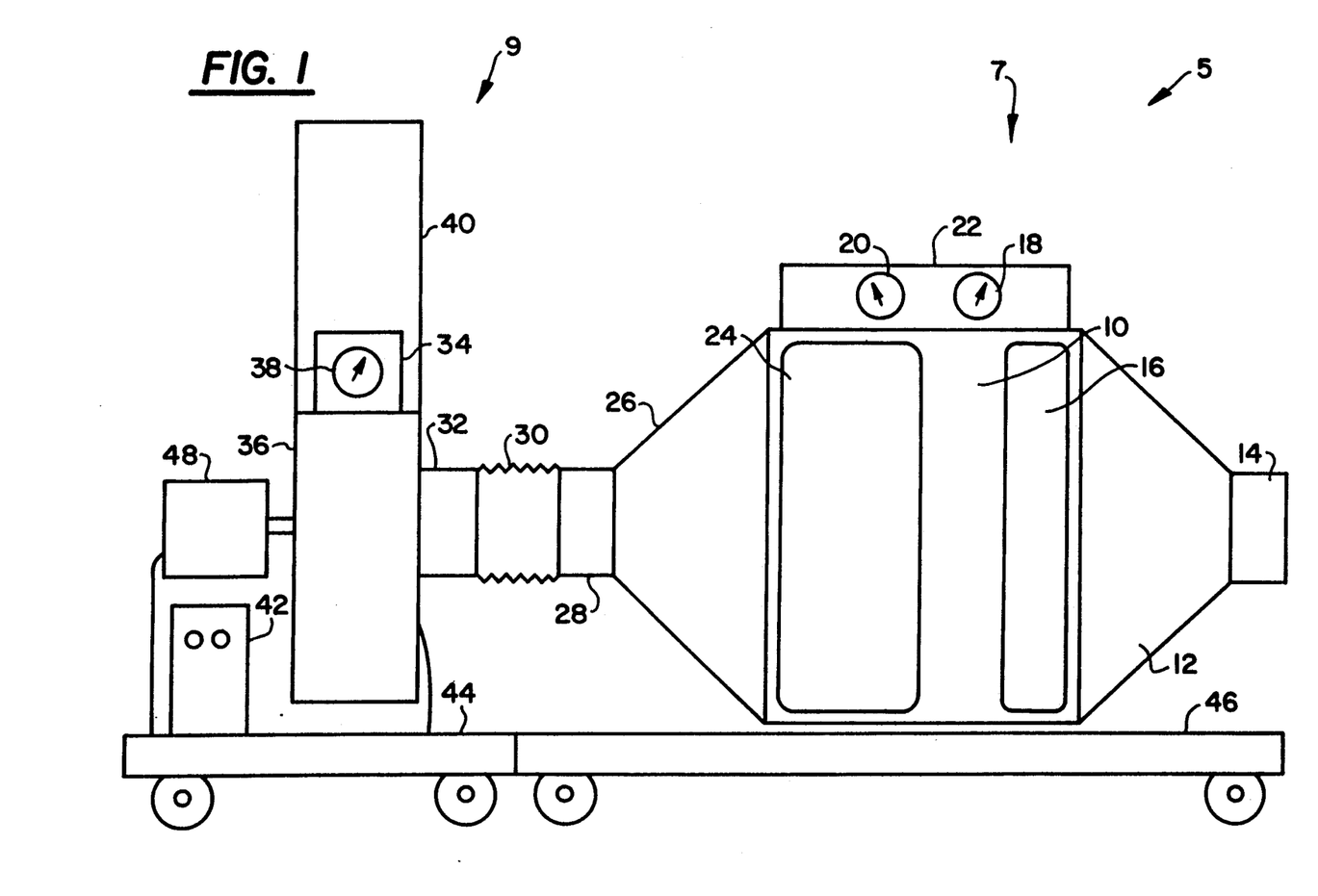
FIG. 1 is a side view of a ventilation system used with an air conditioning system or an environmental monitoring unit according to the present invention.

The ventilation system according to the present invention is shown generally at 5 in FIG. 1. Ventilation system 5, which is used in combination with air conditioning unit 100 (FIG. 2) or environmental monitoring unit 200 (FIG. 4), is described herein below and is the subject of U.S. application Ser. No. 07/786,762, now U.S. Pat. No. 5,192,343, and incorporated herein by this reference.

Ventilation system 5 includes two main pieces, fan unit 9 and filter unit 7. Each of filter unit 7 and fan unit 9 sets on its own cart, 46 and 44, respectively. These carts 44, 46 are preferably metal carts to support the weight of the units 7 and 9.

Filter unit 7 includes two filters housed behind doors 16 and 24 located on housing 10. Housing 10 is preferably made of sturdy metal. A prefilter, which is commercially available, is disposed behind door 16 and a HEPA filter, also commercially available, is disposed behind door 24. The HEPA filter is rated at about 12 to 16 inches water gauge, while the prefilter is rated at about 1.3 inches water gauge.

Housing 10 has a gauge holding frame 22 disposed thereon. Gauge holding frame 22 contains two gauges identified by reference numerals 18 and 20. Gauge 18 measures the static pressure across the prefilter housed behind door 16. Gauge 20 measures the static pressure across the HEPA filter housed behind door 24. Installation of the two individual gauges 18 and 20 allows an operator to individually monitor the static pressure across the prefilter and HEPA filter respectively. The readings taken from gauges 18 and 20 are true indications of the static pressure across each of the filters. Gauges 18 and 20 are, for example, magnehelic or photohelic gauges.

Filter unit 7 further includes inlet and outlet channels 12 and 26 respectively. Inlet channel 12 increases in size between inlet connector 14 and filter housing 10. Inlet connector 14 is sized so that a flexible ducting (not shown) may be connected thereto. The flexible duct is positioned in the area to be ventilated, and the air from this room is drawn through the duct, into inlet channel 12, through filter housing 10 and the pre- and HEPA filters, and is then expelled through outlet channel 26.

Outlet channel 26 is constructed of a metal piece the same size as inlet channel 12. Outlet channel 26 funnels the air flowing through housing 10 to a smaller flow diameter in outlet connector 28. Outlet connector 28 is a metal piece the same size as inlet connector 14. The air that flows through housing 10 and the filters contained therein exits filter unit 7 via outlet channel 26 and outlet connector 28.

Outlet connector 28 is connected to a piece of flexible ducting 30. Flexible ducting 30 connects filter unit 7 to fan unit 9. It is possible that duct 30 could have considerable length, thereby allowing fan unit 9 and filter unit 7 to be spaced apart by a significant amount. That is, carts 44 and 46 could be moved so as not to abut each other.

The free end of duct 30 is connected to fan transition element 32. Fan transition element 32 is the same size as outlet connector 28.

Fan unit 9 includes exhaust fan 36 that operates at a high static pressure to produce the required airflow through the ventilation system 5. An example of such a fan is one that has an airflow of 1000 cfm (cubic feet per minute) at 12 inches water gauge. Of course, if it is desired, it is possible to have the airflow be higher or lower. Such changes would result in minor modifications to the invention. The fan is driven by motor/starter 48/42. Fan unit 9 has exhaust duct 40 with a damper at the end of the duct. The exhaust damper in exhaust duct 40 controls the volume of air flowing through the ventilation system 5. Differential pressure gauge 38 mounted in gauge holding frame 34 measures the static pressure across the fan. Gauge 38, like gauges 18 and 20, is, for example, a magnehelic or photohelic gauge.

By adjusting the exhaust damper in exhaust duct 40, it is possible to regulate the volume of air flowing through ventilation system 5. By adjusting the damper, the airflow can be likewise adjusted until gauge 38 reads the desired reading. This desired reading corresponds to the design reading of the system for airflow and indicates that ventilation system 5 is running as initially determined. An important aspect to operating the ventilation system is to maintain a constant volume discharge.

Figure 2:
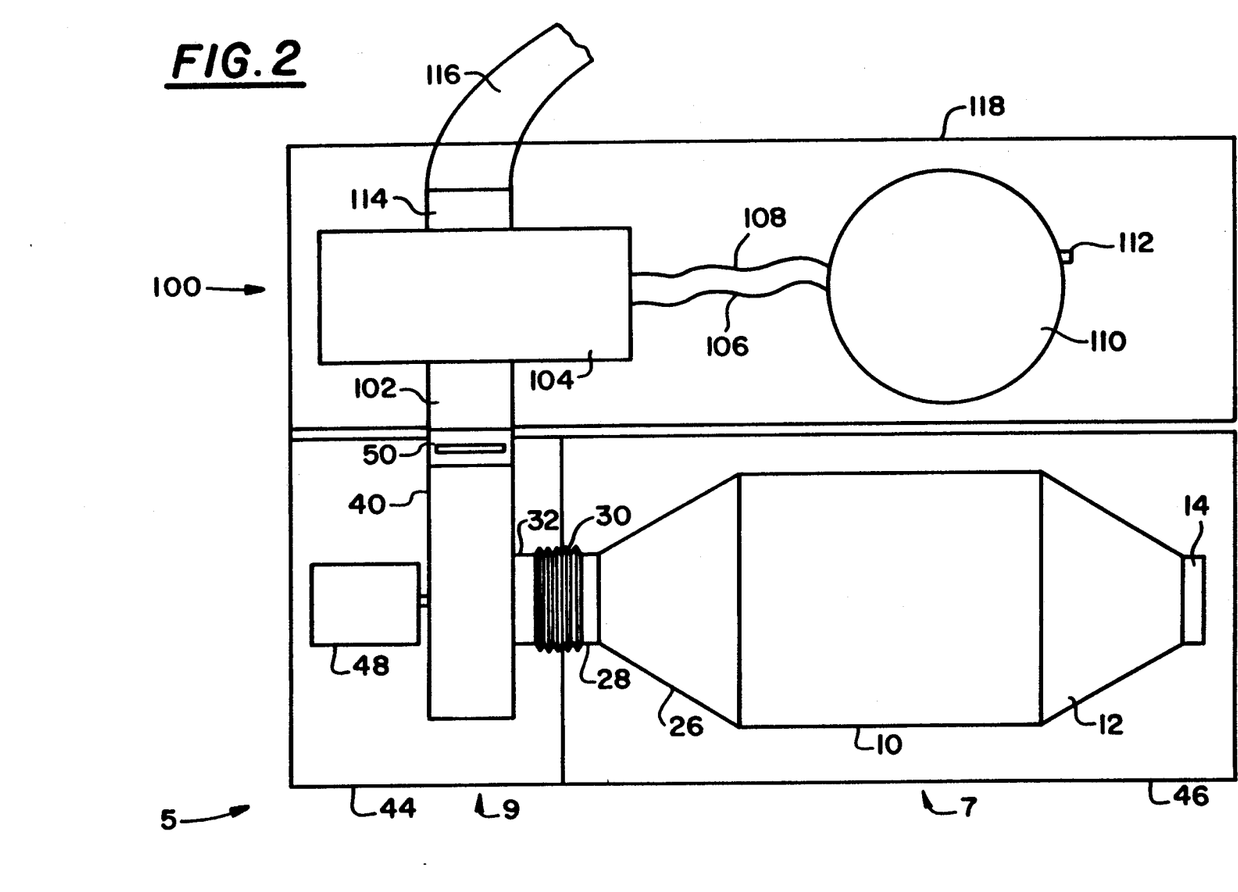
FIG. 2 is a top view of the ventilation system of FIG. 1 used in combination with an air conditioning system.

FIG. 2 illustrates air conditioning unit 100 joined to ventilation unit 5. Input end 102 of air conditioning unit 100 joins with exhaust duct 40 with exhaust damper 50 disposed therein. Input end 102 leads to evaporator coil enclosure 104. Evaporator coil enclosure 104 houses evaporator coils for conditioning the air flowing thereacross. Refrigerant flows between evaporator coil enclosure 104 and compressor 110 via refrigerant lines 106 and 108 whenever the start/stop button 112 is in the on position and compressor 110 is operational. Conditioned air exits through output 114 and flows to the work area being conditioned through flex duct 116. The entire air conditioning unit 100 is mobile, as it sits on cart 118.

Figure 3:
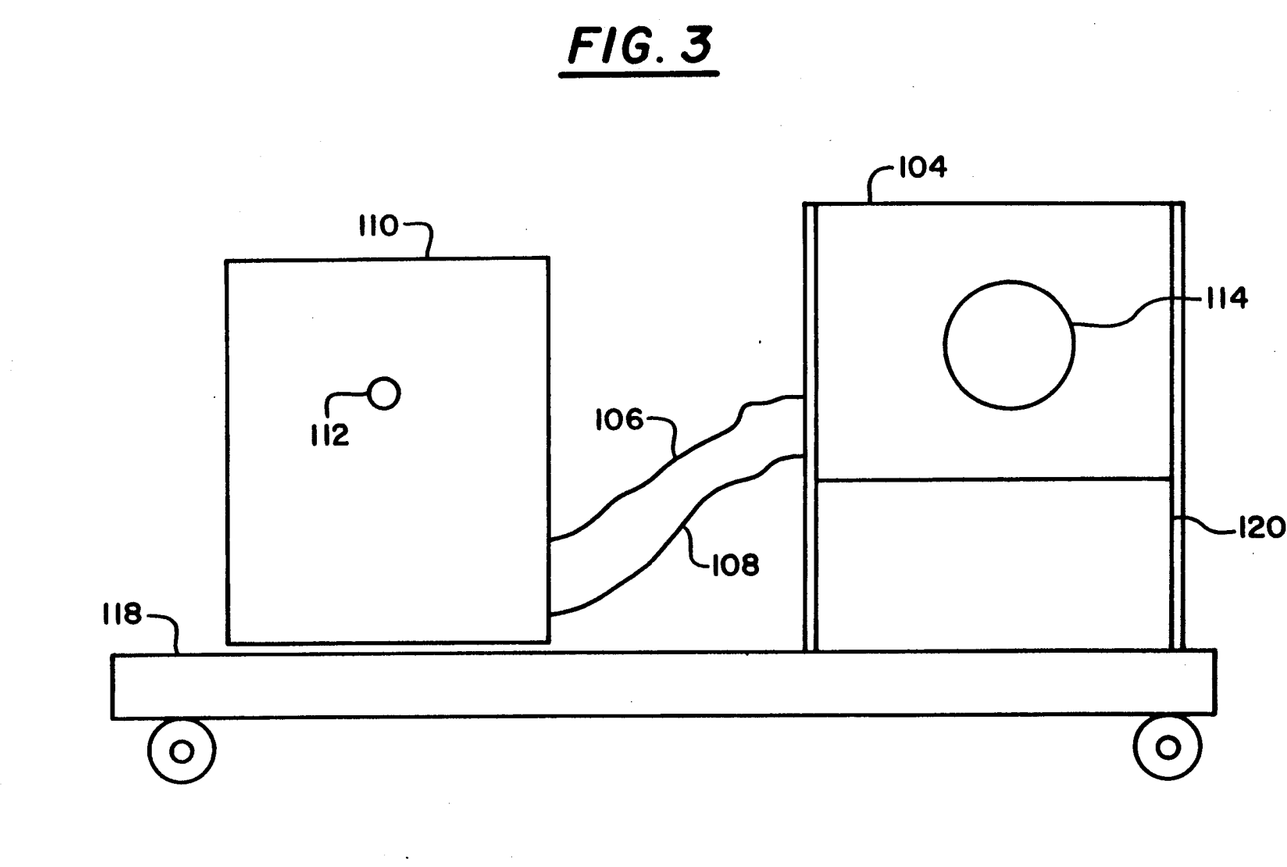
FIG. 3 is a side view of the air conditioning system depicted separately from the ventilation system of FIG. 1.

FIG. 3 presents a side view of the air conditioning unit, alone. It can be best seen in FIG. 3 how refrigerant lines 106 and 108 flow to and from evaporator coils enclosure 104 Furthermore, enclosure 104 may be supported by stand 120.

Figure 4:
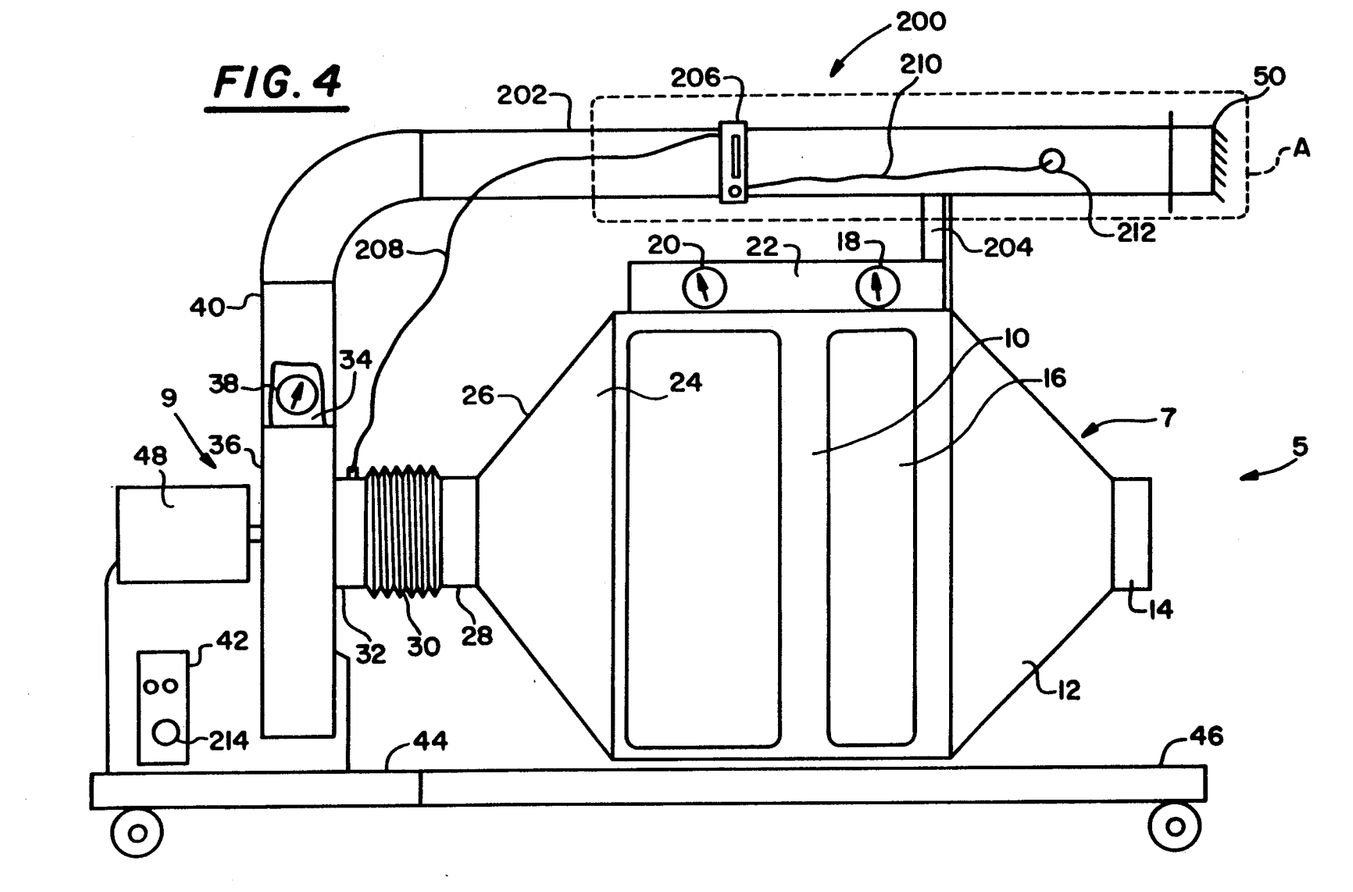
FIG. 4 is a side view of the environmental monitoring system used in combination with the ventilation system of FIG. 1.
Figure 6:
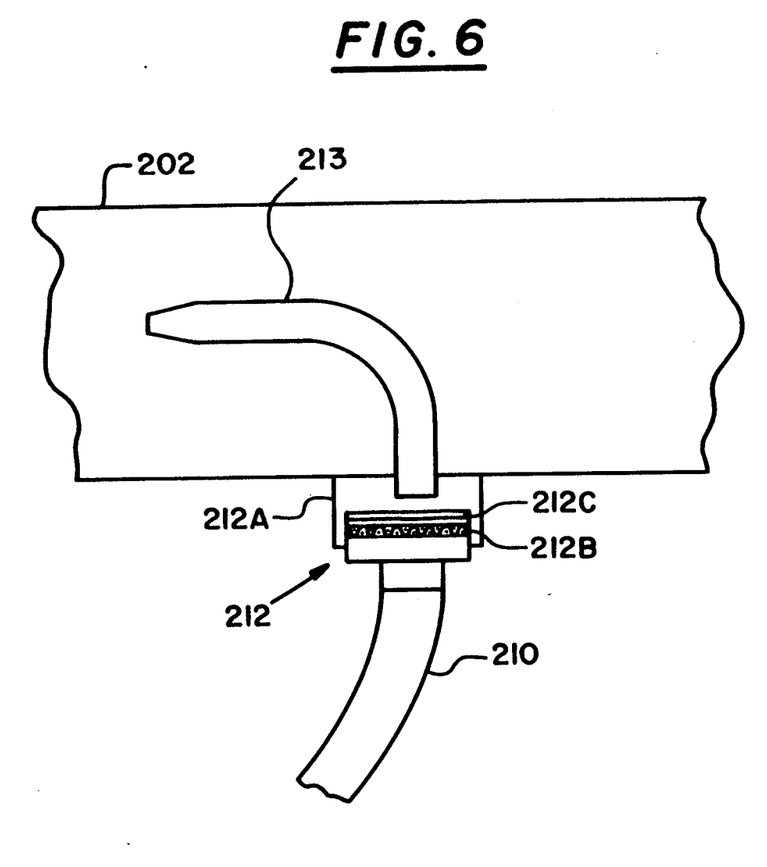
FIG. 6 is a cross sectional view taken along lines 6 in FIG. 5.

FIG. 4 depicts ventilation system 5 provided in combination with environmental monitoring system 200. Exhaust duct 202 is coupled to fan unit's 9 exhaust duct 40. Duct 202 is long enough so that the air flow therethrough becomes streamline prior to being sampled. Support 204 maintains exhaust duct 202 in a position such that the air flow therein becomes streamlined. At the outlet end of exhaust duct 202 is disposed exhaust damper 50 to regulate the volume of air moving through the ventilation unit. As shown in FIG. 6, sample probe 213 is disposed substantially at the center of duct 202 and points towards fan exhaust duct 40. Sample probe 213 is connected to duct 202 via sample probe and patch holder 212. Sample probe and patch holder 212 includes outer casing 212A, screen 212B and filter patch 212C. Filter patch 212C collects a representative sample of any radioactive material that may bypass or pass through the ventilation system 5.

Figure 5:
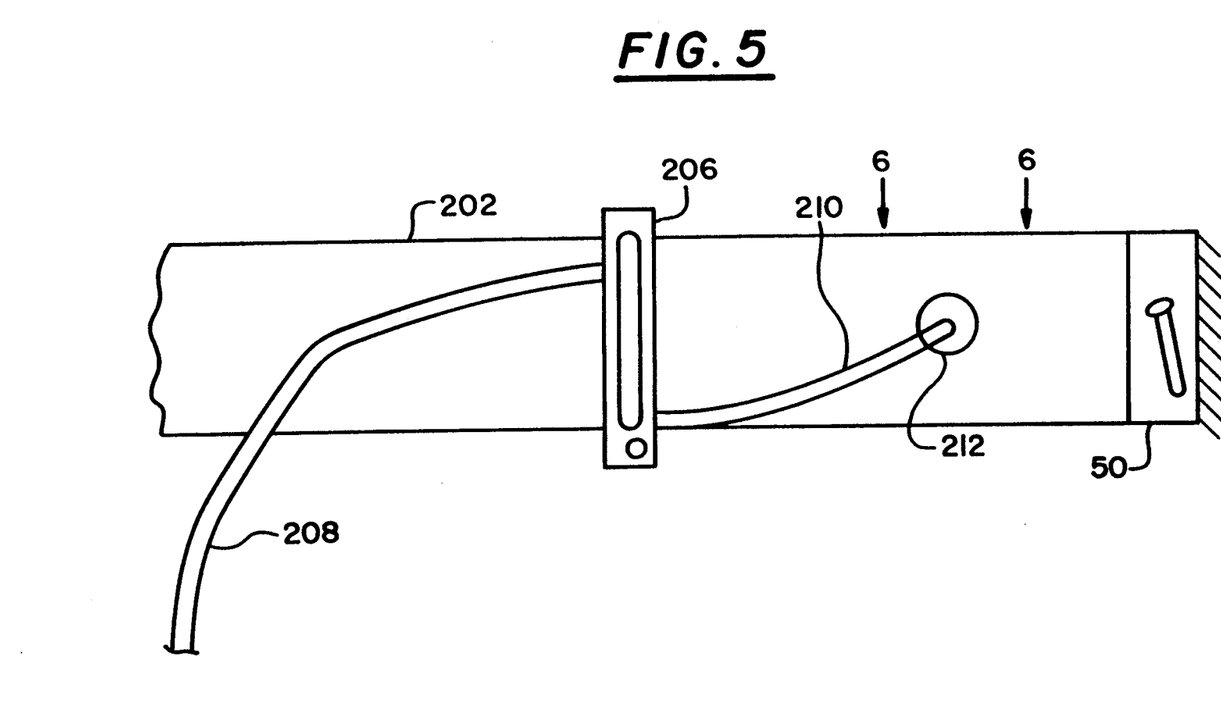
FIG. 5 is an enlarged view of the part of FIG. 4 in the dashed box A.

Sample probe and patch holder 212 is connected to flow meter 206 via tubing 210 as shown in FIGS. 4 and 5. Flow meter 206 serves to set the initial flow conditions and is later used to regulate the flow as filter patch 212C loads up. The discharge of flow meter 206 is connected to fan transition element 32 via tubing 208. Such a connection allows a user to take advantage of the high static pressure produced by exhaust fan 36 and use the differential pressure across the fan to provide the required sample flow.

In order to calculate properly the amount of radioactive contamination released to the environment, it is also necessary to know the total amount of air being discharged. To accomplish this, hour meter 214 is installed across fan motor 48 so that hour meter 214 operates any time the fan unit 9 is in operation. By maintaining the discharge volume of air constant and knowing the amount of time the unit operated, the operator can determine the total volume of air discharged per unit time.

The present invention has been described in connection with what is presently considered to be the most practical and preferred embodiments. Of course, it is to be understood that the present invention is not limited to the disclosed embodiment, but is intended to cover various modifications and equivalent arrangements included within the spirit and scope of the appended claims.

What is claimed is:

1. An apparatus for ventilating an area, in combination with an air conditioning apparatus, comprising:
   a housing having an inlet and an outlet;
   a fan for moving air through the housing;
   first monitoring means for monitoring a first static pressure across said fan;
   first filter means mounted in said housing for prefiltering the air moving through the housing;
   second monitoring means for monitoring a second static pressure across said first filter means;
   second filter means mounted in said housing for filtering the air filtered by said first filter means;
   third monitoring means for monitoring a third static pressure across said second filter means;
   means for varying a volume of air flowing through said housing and said fan, wherein said varying means comprises a damper mounted in an outlet passage from said fan; and
   an air conditioning apparatus operatively connected to said outlet passage for cooling air discharged from said fan, an output of said air conditioning apparatus being connected to said area, whereby air drawn from said area and through said ventilating apparatus is cooled before re-entering said area.

2. The combination as claimed in claim 1, wherein said first, second and third monitoring means are one of magnehelic gauges and photohelic gauges.

3. The combination as claimed in claim 1, wherein said second filter means is a HEPA filter.

4. The combination as claimed in claim 1, wherein said fan is remote from said housing and operatively connected to said outlet of said housing.

5. The combination as claimed in claim 1, wherein said fan is disposed on a first cart and said housing is disposed on a second cart.

6. The combination as claimed in claim 5, wherein said fan and said housing are connected via a segment of flexible ducting.

7. The combination as claimed in claim 1, wherein said air conditioning apparatus includes:
 evaporator coils for conditioning said air discharged from said fan;
 a housing for said evaporator coils;
 a compressor coupled to said housing for said evaporator coils via first and second refrigerant lines;
 means for starting and stopping said compressor; and
 an output from said housing for said evaporator coils operatively coupled to said area.

8. The combination as claimed in claim 7, wherein said output from said housing for the evaporator coils includes a flexible duct connected thereto for being disposed in said area.

9. The combination as claimed in claim 7, wherein said air conditioner is mobile and is disposed on a movable cart.

10. An apparatus for ventilating an area in combination with an environmental monitoring system, comprising:
 a housing having an inlet and an outlet;
 a fan for moving air through the housing;
 first monitoring means for monitoring a first static pressure across said fan;
 first filter means mounted in said housing for prefiltering the air moving through the housing;
 second monitoring means for monitoring a second static pressure across said first filter means;
 second filter means mounted in said housing for filtering the air filtered by said first filter means;
 third monitoring means for monitoring a third static pressure across said second filter means;
 means for varying a volume of air flowing through said housing and said fan, wherein said varying means comprises a damper mounted in an outlet passage from said fan; and
 an environmental monitoring system operatively coupled to said outlet passage for measuring contamination in air discharged from said fan.

11. The combination of claim 10, wherein said first, second and third monitoring means are one of magnehelic gauges and photohelic gauges.

12. The combination of claim 10, wherein said second filter means is a HEPA filter.

13. The combination of claim 10, wherein said fan is remote from said housing and operatively connected to said outlet.

14. The combination of claim 10, wherein said fan is disposed on a first cart and said housing is disposed on a second cart.

15. The combination of claim 14, wherein said fan and said housing are connected via a segment of flexible ducting.

16. The combination of claim 10, wherein said environmental monitoring system includes:
 an exhaust duct from said fan, said exhaust duct being of a length such that air flow therein is streamline;
 a probe patch holder including a probe and a filter patch, said probe disposed in said exhaust duct;
 a flow meter disposed on said exhaust duct; and
 means for determining a period of time for which said fan has been operational.

* * * * *